H. E. WARREN.
TIME INDICATING APPARATUS.
APPLICATION FILED JULY 21, 1920.
1,420,895.
Patented June 27, 1922.
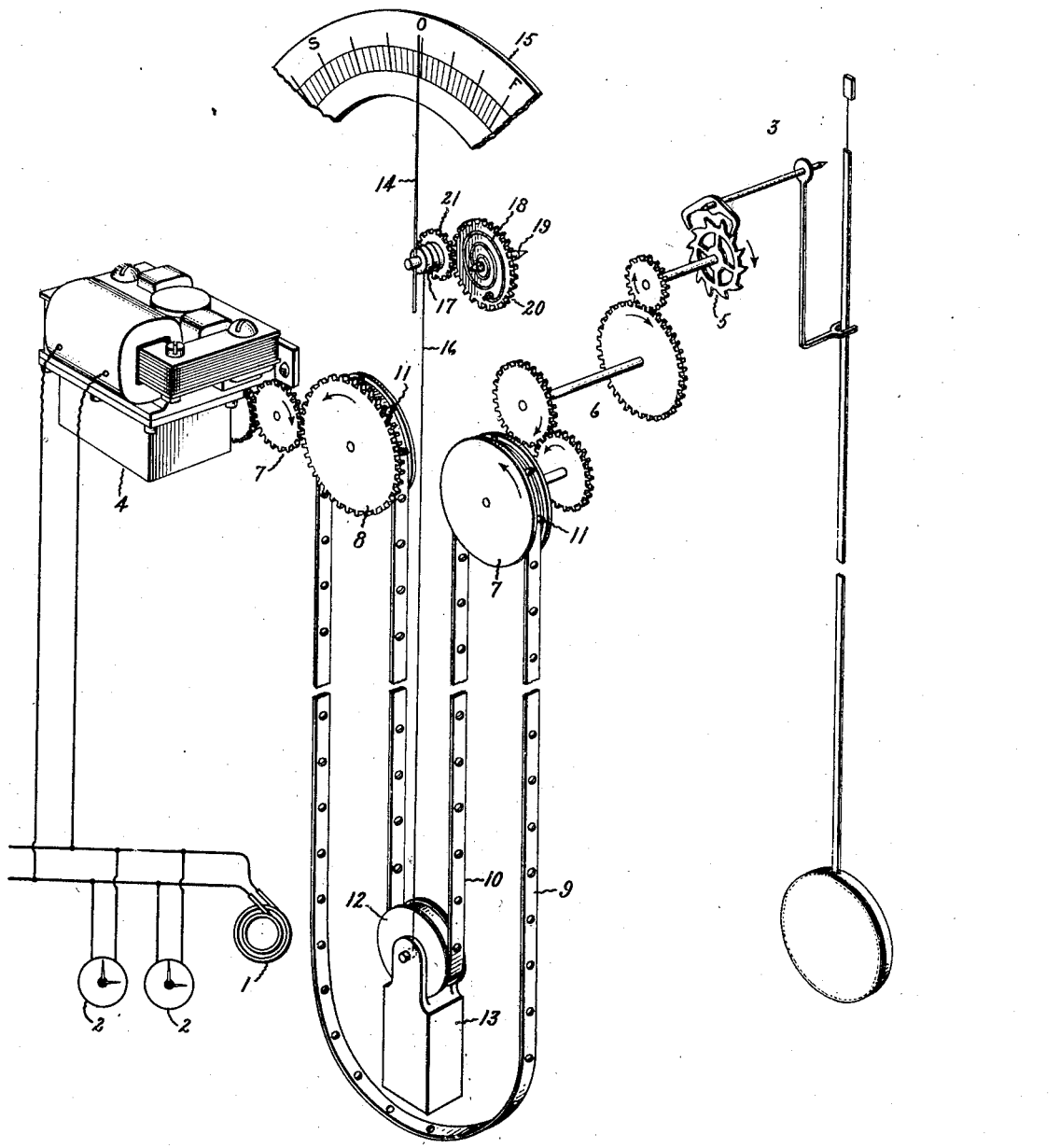
Inventor:
Henry E. Warren,
by Alban G. Davis
His Attorney.

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

TIME-INDICATING APPARATUS.

1,420,895.     Specification of Letters Patent.     Patented June 27, 1922.

Application filed July 21, 1920. Serial No. 397,920.

*To all whom it may concern:*

Be it known that I, HENRY E. WARREN, a citizen of the United States, residing at Ashland, in the county of Middlesex, State of Massachusetts, have invented certain new and useful Improvements in Time-Indicating Apparatus, of which the following is a specification.

This invention relates to time indicating apparatus and to systems for the distribution of time by means of synchronous motor driven secondary clocks.

In my prior application, Serial No. 370,787, filed April 2, 1920, and assigned to the same assignee as the present application, I describe a system for indicating the deviation of time between a standard time piece and the secondary clocks operated from a commercial source of alternating current, so that the central station operator may know whether to speed up or slow down the alternator to make the secondary clocks indicate correctly. In general my present invention is adapted to perform the same functions as the system described in the prior application. I have found that my present invention is in many instances more applicable than that disclosed in my prior case, since there are fewer parts needed for the system.

In the present instance I provide a long flexible belt or chain adapted to be driven by a small synchronous motor, preferably self-starting, as described in any one of the prior patents granted on my inventions, Nos. 1,283,432, 1,283,433 or 1,283,435. I utilize a standard clock movement also connected to the belt or chain for permitting it to be advanced in accordance with the oscillating motion of the escapement. By appropriately proportioning the driving gearing, it is possible to have the motor move the belt at the same rate as the clock movement does. Should there be any variation in the speed of the synchronous motor with respect to the speed of the standard clock movement, the length of the belt between the two driving points changes. This change in length is utilized for indicating the variations in speed of the synchronous motor and thus the variations in the time indications of the secondary clocks connected to the system, also preferably operated by self-starting synchronous motors. For obtaining these indications any well-known means may be utilized and I illustrate in the present application but one of the possible forms that this means may take.

The construction and mode of operation of my invention will be understood from the following description taken in connection with the accompanying drawing, in which the single figure represents the system as a whole with the operative parts of the comparing apparatus shown in distorted perspective.

Referring now more in detail to the drawings, in which like reference characters refer to like parts throughout, the alternating current generator 1 driven by any appropriate means is adapted to supply current to the load as well as to a plurality of secondary clocks 2 connected to the mains. For the purpose of indicating to the central station operator whether it is necessary to speed up the alternator or to slow it down in order that the secondary clocks may indicate correctly, I provide an apparatus adapted automatically to compare the speed of a standard clock movement 3 and a synchronous motor 4 connected to the mains. Any form of clock movement may be utilized and I have shown in the present instance a pendulum actuated escapement rotating in the direction shown by the arrow near the scape wheel 5. The speed of rotation of this scape wheel is reduced by appropriate gearing 6 which is connected so as to rotate a wheel or pulley 7. In the same way the synchronous motor 4, which is here shown as of the self-starting type, described in the Letters Patent referred to hereinbefore, is appropriately geared to a similar wheel or pulley 8. The direction of rotation of wheels 7 and 8 is indicated by the arrows thereon. The gear ratios are so chosen that when the synchronous motor 4 operates at correct speed then the speeds of rotation of these wheels 7 and 8 are equal. When the speed varies I provide appropriate means for indicating this speed variation for showing the accumulated excess of the movement of one wheel over the other. This is equivalent to an indication of the difference in the time shown by the secondary clocks 2 and the standard time, since the synchronous motor 4 operates in unison with the motors driving the clocks 2. To effect this result I make use of a long flexible belt or chain 9, passing over both of the wheels 7 and 8, forming a loop 10 therebetween. In order to prevent slipping of said belt 9 over the wheels 7 and 8 I provide pins 11 in the faces of said wheels cooperating with holes appropriately located in the long flexible belt 9. When the secondary clocks 2 run at the correct speed, then the length of the belt included between the wheels 7 and 8 remains constant. Now, if the secondary clocks are slow, then the length of this loop is greater than it should be, while if the secondary clocks are fast, then the length of the loop is decreased, since the wheel 8 takes up more of the loop than the wheel 7 adds to it.

Supported in the loop 10 is a pulley or sheave 12 which may act as a weight, or an additional weight 13 may be used supported upon the shaft of said sheave 12. With this construction it is not at all necessary to provide a spring for keeping the pendulum of the master clock 3 in operation. As a matter of fact, the synchronous motor 4 through the mechanical coupling comprising the belt 9, the wheel 7 and the gearing 6 imparts enough energy to this pendulum to keep it continuously operating. Should the synchronous motor slow down or stop, the weight 13 which is ordinarily continuously lifted by the motor 4, descends and in so doing supplies the required energy for operating the standard clock 3.

The variation in the length of the loop 10 is utilized to actuate a pointer 14, coacting with a stationary scale 15, graduated in appropriate units of time such as seconds or fractions of a second. The indicator 14 may be carried directly by the weight 13, but in the present instance I illustrate an intermediate flexible connection like a thread or wire 16 between the shaft of the sheave 12 and the drum 17 attached to the pointer 14. In order to take up this flexible element 16 as the loop shortens I provide a fine spiral spring 18 one end of which is attached to a stationary shaft 19 and the other end to a gear wheel 20 pivotally mounted on shaft 19 and meshing with wheel 21 rigidly secured to the shaft of the pointer 14. This spiral spring 18 is just strong enough to keep the flexible element 16 wound about the drum 17 and has no effect whatsoever upon the level of the weight 13. In the present instance, movement of the pointer 14 to the right of the zero mark indicates that the clocks are fast, while a movement to the left indicates that they are slow.

From the foregoing description it is readily seen that I provide an extremely simple and compact apparatus for performing the desired functions and that the system I have shown may be used to indicate the deviation in time of the secondary clocks from true time, although these deviations may be due to intermittent interruptions of the service. This is due to the fact that the synchronous motor 4 as well as each of the synchronous motors which serve to drive the secondary clocks will start and stop simultaneously, since they are all self-starting. Therefore, the indications of all of the clocks are accurately represented by the movement of the synchronous motor 4. When the pointer indicates a deviation in time the central station operator performs the appropriate acts for bringing the speed of the alternator 1 back to the required value for the purpose of keeping the integrated value of the alternations at the proper amount.

It is also apparent from the foregoing description that the indication given by this apparatus may be considered without regard to the clocks that are located on the system. For the indication is not merely an indication of the departure of any clocks which may be located on the system from correct time. It is also an indication of the error in the frequency of the system integrated over the time throughout which this error has persisted. This may be called the integrated or accumulated error in the frequency of the system. For example, if, when the apparatus is indicating zero and the frequency is normal, say 60 cycles per second, the frequency suddenly jumps to 61 cycles per second and remains there, the accumulated error in frequency will steadily grow from zero to larger and larger values. If its value one minute after the frequency jumped to 61 be taken as the unit of accumulated error in frequency, its value will be 5 at the end of five minutes, and so on. This accumulated error in frequency is a measure of the error in time of any synchronous motor clocks located on the system if the clocks were set correctly at a time when the accumulated error as shown by the indicating apparatus was zero.

While I have shown in the accompanying drawing the preferred embodiment of my invention, it is not limited thereto and I aim in the appended claims to embrace all modifications falling fairly within the scope of my invention.

What I claim as new and desire to secure by Letters Patent of the United States, is:—

1. A device actuated in accordance with the accumulated error in frequency in an alternating current circuit, having in combination an endless belt, a synchronous motor having means which engages the belt at one point in the length thereof to cause the belt to move at that point with a speed proportional to the speed of the motor, means engaging the belt at another point in the length thereof which causes the belt to move at that point with a uniform speed, and means actuated by the variations in the length of one of the two sections of the belt lying between the two belt engaging means.

2. A device for indicating the accumulated error in frequency in an alternating current circuit, having in combination a synchronous electric motor located in the circuit, a clock movement and means for comparing the speeds of said motor and movement comprising an endless belt driven at one point by said motor and having its speed at another point controlled by the clock movement and indicating means responsive to the length of said belt between said two points.

3. In a system for the distribution of time by means of synchronously driven clocks located in an alternating current circuit, means for indicating whether said clocks are fast or slow comprising an endless belt, a synchronous electric motor connected in the circuit and cooperating with said belt at one point in the length thereof to drive it, a standard clock movement controlling the speed of said belt at another point in the length thereof, and an indicator moved in response to variations of said belt length included between the synchronous motor drive and the standard clock control.

4. A system for the distribution of time comprising synchronously driven clocks located in an alternating current circuit, two wheels, an endless belt passing over said wheels so as to form two loops, a synchronous electric motor located in the circuit and driving one of said wheels, means causing the motion of the other of said wheels to be uniform and means operated by variation in the length of one of the loops.

5. In a system for the distribution of time by means of synchronously driven clocks located in an alternating current circuit, two wheels, an endless belt passing over said wheels so as to form two loops, a synchronous electric motor located in the circuit and driving one of said wheels, means causing the motion of the other of said wheels to be uniform, a weight in one of the loops indicating means responsive to the position of the weight.

In witness whereof, I have hereunto set my hand this 14th day of July, 1920.

HENRY E. WARREN.